Dec. 20, 1966     R. L. DILLS     3,293,411
OVEN TEMPERATURE CONTROL WITH REMOTE SENSOR
Filed June 12, 1964     3 Sheets-Sheet 1
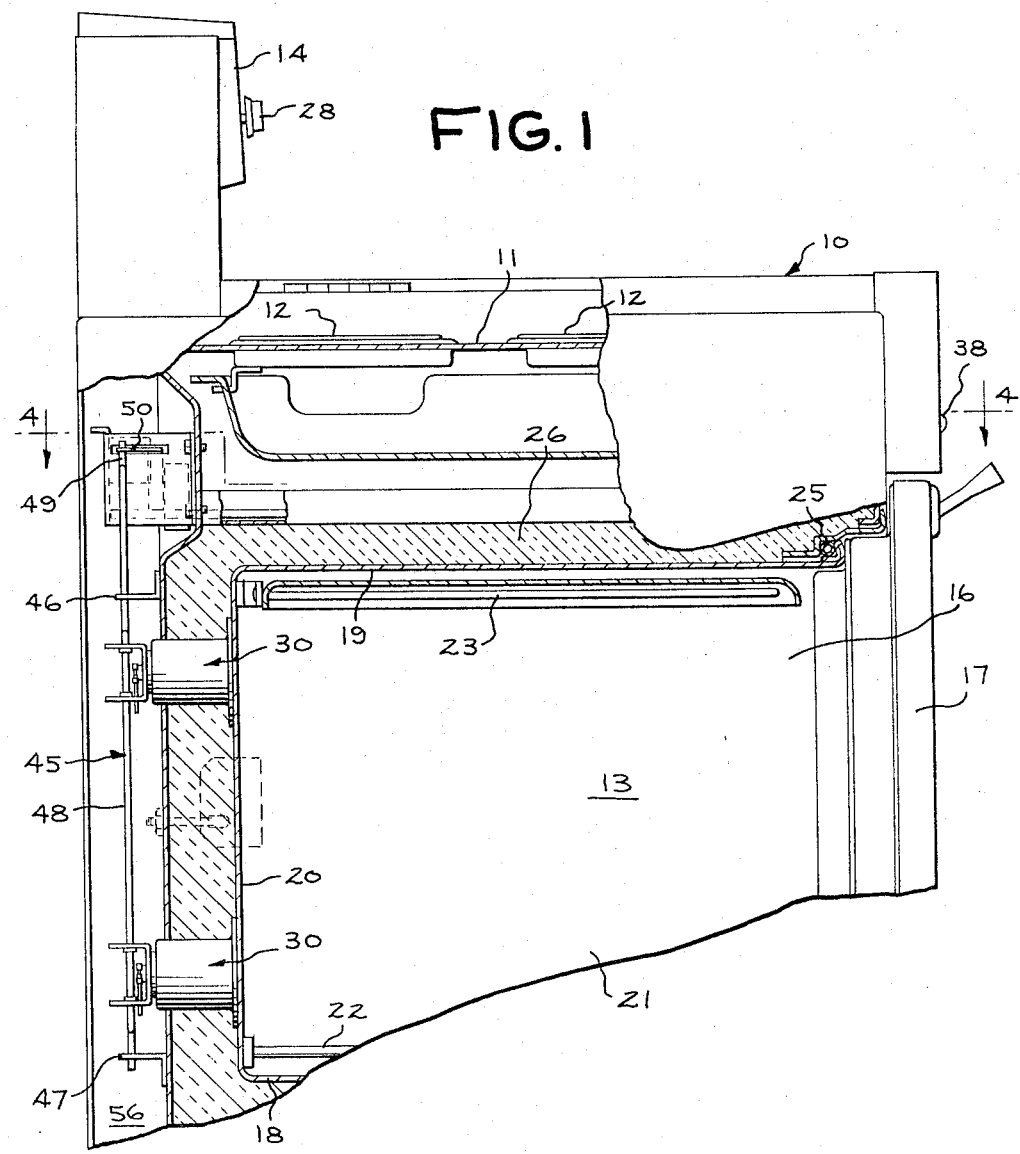
INVENTOR.
RAYMOND L. DILLS
BY *Richard L. Caslin*
HIS ATTORNEY

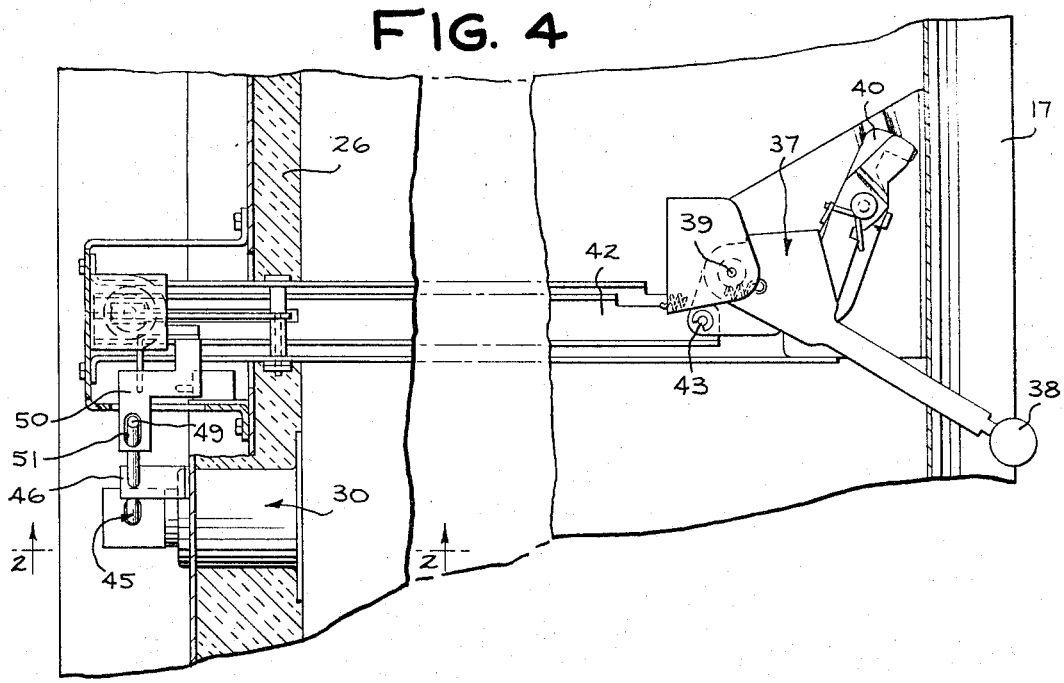
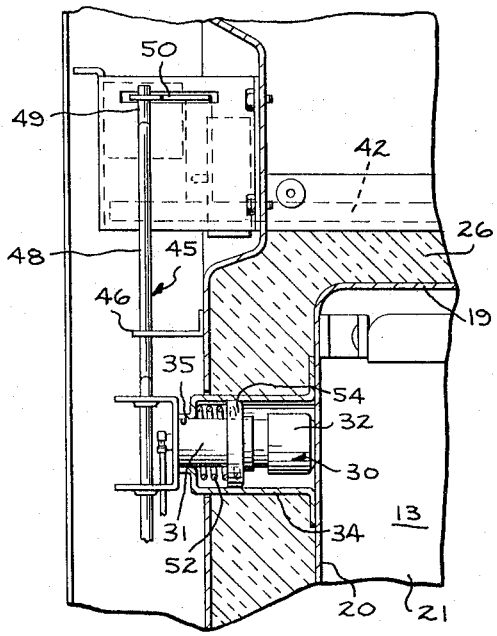
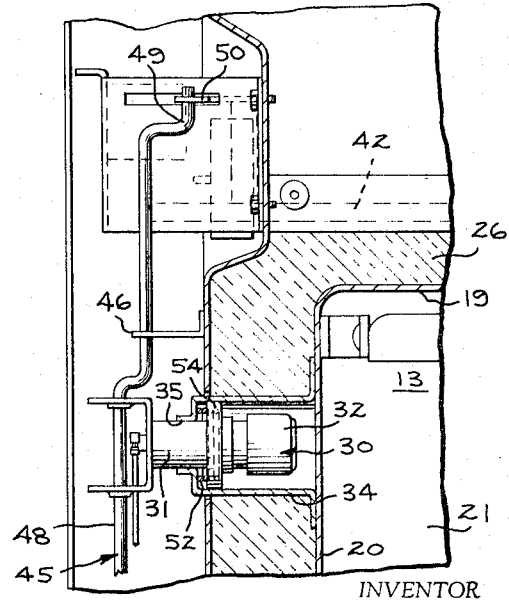

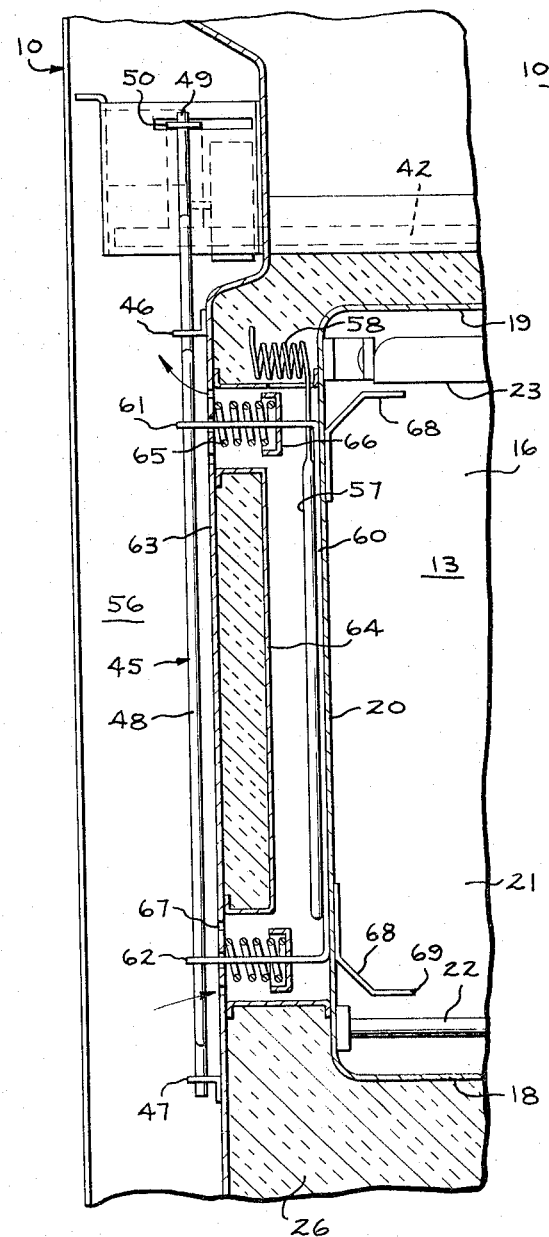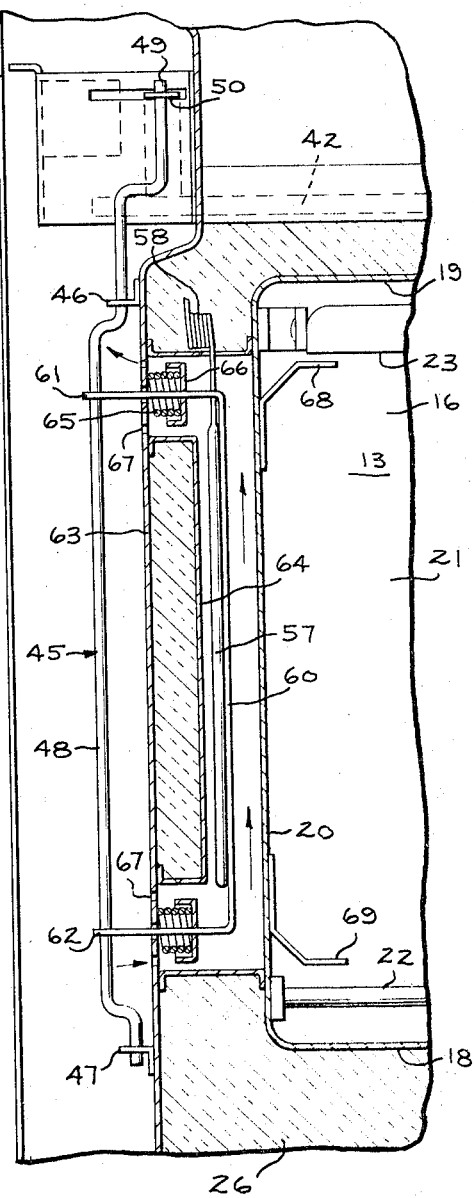

United States Patent Office 3,293,411
Patented Dec. 20, 1966

3,293,411
OVEN TEMPERATURE CONTROL WITH REMOTE SENSOR
Raymond L. Dills, Louisville, Ky., assignor to General Electric Company, a corporation of New York
Filed June 12, 1964, Ser. No. 374,689
8 Claims. (Cl. 219—393)

The present invention relates to a cooking apparatus and particularly to an oven having a thermostatic control system with an external temperature sensor means that will operate through two temperature ranges such as a normal cooking temperature range of about 150° F. and 550° F. as well as in a heat cleaning temperature range having a maximum temperature somewhere between about 650° F. and 950° F.

Hydraulic oven thermostats have been used for many years, and they have been perfected to a high degree of reliability. One such thermostat design is disclosed in the patent to W. J. Ettinger No. 2,260,014 dated October 21, 1941, and assigned to General Electric Company, assignee of the present invention. Such hydraulic thermostats include an elongated bulb or probe formed on the end of a capillary tube, and this tube in turn is joined to a bellows or diaphragm within the thermostat housing. Such a housing is usually mounted on the control panel or backsplash of the range. The normal oven cooking temperatures have always been below about 550° F. maximum, and the thermally responsive fluids used in such thermostats have been able to withstand this degree of temperature without difficulty. However, the known thermally responsive fluids available today cannot be operated at temperature much above 650° F. without chemical breakdown after a given time period.

Heretofore, strong chemical agents have been devised and are commercially available for the express purpose of removing food soil of this type under these conditions. However, even the best of these cleaning agents require strong rubbing action and a great deal of time and energy to complete the task satisfactorily. Also, there exists a safety hazard which might cause injury to the user's hands or eyes if the directions for use are not followed closely.

In recent years a self-cleaning oven design has been perfected using a pyrolytic process which automatically cleans the food particles and grease spatterings from the inner walls of the oven cavity to free the housewife of the drudgery of washing, scrubbing, or scraping the baked-on soil that normally accumulates during the various cooking operations. For a better understanding of the operating principles of a self-cleaning oven, attention is directed to Patent No. 3,121,158 of Bohdan Hurko which is also assigned to the General Electric Company, the assignee of the present invention.

Upon the perfection of the principle of automatic heat cleaning of domestic ovens by the method of pyrolysis, many different systems for applying the heat and controlling the operations were devised to obtain the optimum results. Standard components were used whenever possible to take advantage of the years of engineering development and know-how gained by working with the components. The high oven temperatures experienced during a heat cleaning operation present a problem as to how to protect the temperature sensor so that it remains operational.

The principal object of the present invention is to provide an oven temperature control system with an external or remote temperature sensor, where the sensor is adapted to be moved for increasing the temperature difference between the sensor and the oven air temperature.

A further object of the present invention is to provide an oven temperature control system with a movable external temperature sensor that operates over a wide area so as to be sensitive to variations of temperature from the bottom to the top of the oven.

A further object of the present invention is to provide a movable external temperature sensor of the electrical resistance type for use in the oven control system of the class described.

A further object of the present invention is to provide a pair of movable external temperature sensors of the electrical resistance type for use as an oven temperature control system where the sensors may be controlled individually or in unison in any position thereof.

A still further object of the present invention is to provide a movable external temperature sensor of the hydraulic type for use with an oven temperature control system of the class described.

The present invention, in accordance with one form thereof, is incorporated in a cooking apparatus such as an oven that has an oven cavity formed by an oven liner and an access door. Heating means is provided for supplying heating energy to the oven cavity both for normal cooking operations as well as for raising the temperature above the normal cooking temperatures during an automatic heat cleaning cycle. A thermostatic control system is incorporated with the oven and it includes an external or remote temperature sensor that in one position is adapted to bear against the outside of a wall of the oven liner, and in a second position is adapted to be retracted from the wall a predetermined amount so the sensor experiences a temperature which is an analog of the oven wall temperature. One modification of the invention incorporates an electrical temperature control system where the sensor is represented by an electrical resistance element having a high temperature coefficient of resistance. A second modification of the invention includes a hydraulic temperature control system with a fluid-filled probe as the external temperature sensor, and it is preferably mounted in a vertical position so as to sense the temperature variations between the bottom and top of the oven cavity.

My invention will be better understood from the following description taken in conjunction with the accompanying drawings and its scope will be pointed out in the appending claims.

FIGURE 1 is a left side elevational view of a free-standing electric range embodying one modification of the present invention with some of the parts broken away to show the oven cavity and particularly the location of a pair of external temperature sensors of the electrical thermostatic control system;

FIGURE 2 is a fragmentary view similar to the upper rear portion of FIGURE 1 taken on the line 2—2 of FIGURE 1 and showing the upper temperature sensor partially in cross-section where the sensor is in direct thermal contact with the back wall of the oven cavity;

FIGURE 3 is a fragmentary view similar to that of FIGURE 2 with the same temperature sensor moved a predetermined amount to a retracted position out of contact with the back wall of the oven cavity;

FIGURE 4 is a top cross-sectional plan view taken on the line 4—4 of FIGURE 1 slightly above the top wall of the oven liner to show the oven door latching mechanism and its connection with the external temperature sensors;

FIGURE 5 is a fragmentary view similar to that of FIGURE 2 showing a second modification of the invention using a hydraulic system with a single fluid-filled bulb in place of the pair of electrical resistance elements of the first modification, where the bulb is shown in good thermal contact with the rear wall of the oven liner as it is used during normal cooking operations;

FIGURE 6 is a fragmentary view similar to that of FIGURE 5 showing the bulb in the retracted position for use during a high temperature oven operation.

Turning now to a consideration of the drawings, and in particular to FIGURE 1, there is shown for illustrative purposes a free-standing electric range having a body or cabinet structure 10 with a recessed top cooking surface 11 including a plurality of surface heating elements 12, an oven cavity 13 located beneath the cooktop 11, and a backsplash 14 arranged along the back edge of the cooking surface 11 and including a control panel (not shown) on which many of the control components are mounted. The oven cavity 13 is formed by a box-like oven liner 16 and a front-opening access door 17. The oven liner has a bottom wall 18, a top wall 19, back wall 20 and opposite side walls 21.

The oven includes two standard electric heating elements; namely, a lower bake element 22 arranged adjacent the bottom wall of the oven liner, and an upper broil element 23 which is located just beneath the top wall 19 of the oven liner. Because it is important to have generally uniform temperatures at the inner walls of the oven liner and door during the high temperature heat cleaning operation, an additional heating element known as a mullion or perimeter heater 25 is assembled around the front of the oven liner 16 adjacent the door opening. This mullion heater surrounds the oven liner in such a way that the oven door 17 protrudes through the plane of the mullion heater as is clearly shown in FIGURE 1. An oven selector switch (not shown) would be located in the power circuit for the heating elements for setting up various circuit combinations for the different cooking operations as well as the heat cleaning operation. Thermal insulating material 26 such as fiberglass or the like surrounds the outside of the oven liner 16 for retaining as much of the heat within the oven cavity as is possible for efficient operation as well as to prevent excessive temperatures on the outer surfaces of the range body 10 which might otherwise result in personal injury.

An oven thermostat 28 is located in the control panel of the backsplash 14, and it serves as a temperature control means for the energization of the heating means; namely, the bake element 22, the broil element 23, and the mullion heater 25. It is necessary for the thermostat 28 to have a temperature sensor that is in heat transfer relationship with the oven for determining the oven temperature and signalling this temperature to the thermostat 28 which in turn receives and then acts upon this temperature information and governs the oven temperature to a degree determined by the adjustable setting of the thermostat. One such temperature sensor is shown in FIGURE 1 and it is represented by an assembly 30 which incorporates an electrical resistance element having a high temperature coefficient of resistance and is adapted to be in heat transfer relationship with the oven.

The particular construction of the sensor 30 does not form part of the present invention since it is of the general type that is available on the market as is taught by the Sivacek Patent 2,980,875, and it is widely used for automatic surface unit controls on both electric and gas ranges. Looking at FIGURE 2, it should suffice to say that this sensor 30 comprises a barrel or cannister 31 and an outwardly biased cap 32. The cap is biased by an internal spring that is not illustrated. The cap is captured on the barrel 31 and is allowed a certain amount of controlled longitudinal movement. The flat face or end wall of the cap 32 is provided with a pellet (not shown) that has a relatively large surface area to provide accurate sensing of the temperature of the pan, cooking utensil or oven wall whose temperature is to be controlled. The reason for spring-biasing the cap is to insure intimate heat transfer relationship between the sensor and the controlled utensil. This pellet includes an insulated resistance wire wound in a planar spiral and sandwiched between a pair of relatively thin plates. This resistance wire is connected in a low voltage circuit back to the thermostat or temperature responder 28.

Notice that the sensor 30 is mounted within a tubular shield 34 through a close-fitting opening 35 in the back wall of the shield so that the sensor is capable of longitudinal movement within the opening. This shield 34 serves to isolate the sensor from the fibrous insulation 26 as well as to dissipate heat away from the sensor so that temperature experienced by the sensor will be the temperature of the oven liner rather than of the range body or surrounding elements.

Looking at FIGURE 1, it should be recognized that there are two temperature sensors 30 vertically spaced from each other, where the lower sensor is arranged adjacent the bake element 22, while the upper sensor 30 is positioned adjacent the broil unit 23. By using two resistance type sensors, it is possible to simulate the effect of an elongated fluid-filled bulb of a hydraulic thermostat system so that the temperature over a large area of the oven is sensed to compensate for differences in the wattages of the bake and broil units, convection air currents, radiation blockage from using cookie pans and large cooking utensils, etc. Also, by using two sensors it is possible to obtain excellent broiling results by cutting out the lower sensor from the control circuit and using only the upper sensor.

The sensor 30 is made of aluminum sheet for good heat transfer properties and the resistance wire is insulated with a fiberglass sheath and these materials would not be stable for an extended period at heat cleaning temperatures that might reach a maximum somewhere around 650° F. and up as high as about 950° F. Hence, the sensor 30 is designed with a first position as is seen in FIGURE 2 where the cap 32 containing the pellet with the resistance element is in direct thermal contact with the back wall 20 of the oven liner. During a high temperature heat cleaning operation the temperature sensor 30 is retracted a predetermined amount away from the oven liner as is best seen in FIGURE 3 so the sensor then experiences a temperature which is an analog of the oven wall temperature thereby protecting the sensor from exposure to high temperatures.

Means must be provided for retracting the two sensors 30 before the heat cleaning operation can begin. The most direct arrangement is to join the sensors 30 together with a door latching mechanism so that whenever the door is locked the sensors will automatically be retracted to the position shown in FIGURE 3. A satisfactory door latching mechanism is illustrated diagrammatically in FIGURE 4 since its precise construction does not form part of the present invention. It is described and claimed in a copending application of Clarence Getman, now Patent No. 3,189,375, which was filed on May 1, 1963, and is assigned to the General Electric Company, the assignee of the present invention. The latching mechanism 37 includes a manually operable handle lever 38 which extends through an elongated slot in the front edge of the cooktop 11 in a position just above and parallel to the top edge of the oven door 17. The handle lever 38 is pivoted about a vertical axis 39 and it has an angle of movement of about 60°. It also has suitable pin and slot or lost motion connections (not shown) with a swinging hook member 40 which is normally recessed within the range body 10, but is capable of swinging outwardly for engagement with a suitable keeper (not shown) on the inner surface of the oven door 17.

Pivotally connected to the handle lever 38 is a connecting rod 42 that extends rearwardly over the top of the oven liner, and this rod is capable of a reciprocating movement from its pivotal connection point at 43 when the handle lever is moved between its open and closed positions. Associated with the rear end of the connecting rod 42 is a vertically arranged crank shaft 45, as is best seen in FIGURE 1, that is supported for limited rotational movement by a pair of vertically spaced support brackets 46 and 47. The two temperature sensors 30 are pivotally supported from an offset crank arm 48, while the rear end of the connecting rod 42 is joined to a second offset crank arm 49 that is oppositely offset from the crank arm 48. The rear end of the connecting rod 42 includes a bracket member 50, as seen in FIGURE 4, that incorporates an elongated slot 51 into which the crank arm 49 is inserted. The angle of turn of the crank shaft 45 is rather slight of about 15° or 20°, but it is enough to move the temperature sensors 30 within the shields 34 between the two positions shown in FIGURES 2 and 3. In order to obtain good thermal contact with the outer surface of the rear wall 20 of the oven liner, an additional compression spring 52 surrounds the cannister 31 and bears against the end of the shield at one end and against an annular shoulder 54 at the opposite end. For a better view of the offset crank arms 48 and 49 attention is directed to FIGURE 3 which is the position of the crank shaft 45 during the heat cleaning operation when the temperature sensors 30 are retracted from contacting the oven liner.

It should be understood that under certain operating conditions it might be necessary to provide a cooling means for the sensors for the dissipation of heat. Either natural convection or forced convection could be utilized in the wiring compartment 56 as seen in FIGURE 1.

Turning now to a consideration of the second modification of FIGURES 5 and 6, the same elements will be identified by the same reference numerals as used heretofore, such as the oven cavity 13, oven liner 16, rear wall 20 of the oven liner, thermal insulation 26 surrounding the oven liner, range body 10, bake element 22, broil element 23, connecting rod 42, crank shaft 45, mounting brackets 46 and 47 and offset crank arms 48 and 49.

The main difference in the second modification of the resistance type temperature sensors 30 is the substitution of a single fluid-filled bulb 57 that is connected to a capillary tube 58 that is in turn associated with a bellows or diaphragm (not shown) in the responder or thermostat 28. This bulb 57 is disposed in a vertical plane so in one position it will be in thermal contact with the rear wall 20 of the oven liner as shown in FIGURE 5, and in a second position will be retracted from the wall a predetermined amount. Since the bulb is made of relatively soft copper tubing, it is supported on a carrier member or elongated plate 60 of high thermal conductive material such as copper, where the copper is in actual contact with the rear wall 20 over a larger area than merely the line contact that would be obtained using the bulb alone. The carrier 60 has at its opposite ends rearwardly turned straps 61 and 62 which extend out through a suitable opening in the insulation guard 63 for connection with the offset crank arm 48 of the crank shaft 45. A spring biasing force is exerted on the carrier 60 in order to press the carrier and hence the bulb 57 into good thermal contact with the rear wall 60. This biasing force is provided by a compression spring 65 surrounding each strap 61 and 62 and confined between the inner surface of the insulation guard 63 and a collar 66 on the strap. The reason for disposing the bulb 57 in a vertical plane is to obtain an effect similar to the use of a pair of vertically spaced resistance type sensors 30 in FIGURE 1 by sensing the oven temperature over a large area to compensate for differences between the bottom and top heat energy output as well as to compensate for differences in the convection air currents through the oven cavity especially when the radiation from the heating element is blocked by large cooking utensils and the like.

There is a need to prevent the thermal insulation 26 from interfering with the free movement of the bulb 57 and its carrier 60. Hence, a suitable box or shielding 64 is installed to encompass the bulb and carries as is shown in FIGURES 5 and 6. Moreover, the box 64 would serve as a cooling duct for handling either natural draft or forced air moving through air passages 67 in the insulation guard 63.

In order to obtain a small lag between the temperature of the bulb and the temperature of the oven wall and oven air, heat fins 68 are fastened to the rear wall 20 of the oven liner adjacent the hydraulic bulb 57. Each fin has a cantilever finger 69 that is formed to lie in close proximity with the adjacent heating element, whether it be the bake unit 22 or the broil unit 23 to serve as a heat pipe or anticipation for the hydraulic bulb 57 during normal cooking operations when the bulb is in thermal contact with the rear wall 20 of the oven liner.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A domestic oven comprising a cabinet having walls defining an oven cavity, heating means for said cavity, means for connecting the heating means to a source of energy, control means for said heating means to effect various cooking operations, a temperature control means for said heating means settable to control the heating means to hold a selected temperature, said temperature control means comprising a temperature sensor associated with a manually settable temperature responder so that the experienced temperatures of the sensor will be reflected by the responder which in turn is adapted to control the energy delivered to the heating means; the invention comprising the location of the sensor outside the oven cavity where the sensor in one position is in thermal contact with the wall defining the oven cavity, and means for moving the sensor away from the oven wall a predetermined amount so the sensor experiences a temperature which is an analog of the oven wall temperature.

2. A cooking apparatus comprising a box-like oven liner and an access door that form an oven cooking cavity, heating means for said cavity, means for connecting the heating means to a source of energy, control means for said heating means selectably operable to control the heating means to effect either a baking operation, a broil operation, or a high temperature heat cleaning operation, a temperature control means for said heating means comprising at least one temperature sensor for experiencing the temperature generated by the heating means, and a responder for receiving variable signals from the sensor that correspond to the temperature variations of the sensor and reacts to govern the supply of energy to the heating means; the invention comprising the location of the sensor in one position in thermal contact with an outer surface of the wall defining the oven cavity, and latching means for retracting the sensor away from the oven wall a predetermined amount into a second position for use during a high temperature heat cleaning cycle to increase the temperature difference between the sensor and the oven wall, said latching means also being associated with the access door for simultaneously retracting the sensor and latching the door in a closed position, the retraction of the sensor serving to protect the sensor from exposure to high temperatures by causing the sensor to experience a reduced temperature which is an analog of the oven wall temperature.

3. A cooking apparatus as recited in claim 2 wherein the temperature sensor comprises a combined pair of spaced members, where each member includes a housing supporting at its face an electrical resistance element having a high temperature coefficient of resistance, the spaced pair of resistance elements serving to experience the oven temperature over a large area so as to compensate for temperature variations in different portions of the oven.

4. A cooking apparatus as recited in claim 2 wherein the temperature control means comprises a hydraulic thermostatic system having a fluid-filled elongated bulb as a temperature sensor, where the bulb in one position is spring-biased into good thermal contact against the outer surface of a wall of the oven liner, the bulb in a second position being retracted a predetermined amount for substantially its entire length, and cooling means external of the oven cavity and associated with the bulb in its retracted position for withdrawing heat from the bulb.

5. An electric oven comprising a box-like oven liner and an access door that form an oven cooking cavity, heating means for said cavity adapted to be connected to a source of voltage and including an upper broil heating element and a lower bake heating element, a circuit control means for said heating means to effect various heating operations, a temperature control means for said heating means settable to reach and hold pre-selected temperatures, said temperature control means comprising a temperature sensing means associated with a manually settable temperature responder, whereby the experienced temperatures of the sensing means would be reflected by the responder which in turn is adapted to control the voltage to the heating elements; the invention comprising a temperature sensing means in one position having a large area in thermal contact with the outer surface of a rear wall of the oven liner and adjacent both the upper broil heating element and the lower bake heating element, the temperature sensing means being capable of being retracted to a second predetermined position whereby the sensing means experiences a temperature which is an analog of the rear oven wall temperature.

6. A cooking apparatus comprising a cabinet having walls defining an oven cavity, heating means for said cavity, control means for said heating means to effect various cooking operations, a temperature control means for said heating means settable to control the heating means to hold a selected temperature, said temperature control means comprising a temperature sensor associated with a manually settable temperature responder so that the experienced temperatures of the sensor will be reflected by the responder which in turn is adapted to control the energy delivered to the heating means; the invention comprising a pair of electrical resistance type temperature sensors located outside of the oven cavity and having one position where the sensors are in thermal contact with a wall defining a portion of the oven cavity, and means for moving the sensors away from the oven wall a predetermined amount so that the sensors will not be exposed to the same temperatures within the oven cavity but will experience a temperature which is an analog of the oven wall temperature.

7. A cooking apparatus as recited in claim 6 wherein the two electrical resistance type temperature sensors are vertically spaced from each other adjacent a rear wall of the oven cavity where one sensor is located adjacent the top wall of the oven cavity and the second sensor is located adjacent the bottom wall of the cavity, and control means for the sensors whereby in one arrangement they are combined to act in unison, and in another arrangement they are divided into separate controls.

8. A domestic oven comprising a cabinet having walls defining an oven cavity, heating means for said cavity, means for connecting the heating means to a source of energy, control means for said heating means to effect various cooking operations, a temperature control means for said heating means settable to control the heating means to hold a selected temperature, said temperature control means comprising a temperature sensor associated with a manually settable temperature responder so that the experienced temperatures of the sensor will be reflected by the responder which in turn is adapted to control the energy delivered to the heating means; the invention comprising a single fluid-filled bulb of a hydraulic thermostatic system where the bulb is arranged in a vertical plane adjacent the rear wall of the oven cavity, the said heating means being located adjacent a bottom wall of the oven cavity and a second heating means located adjacent the top wall of the oven cavity, portions of the bulb being located adjacent both heating means, the bulb in one position being held in good thermal contact against the outer surface of the rear wall of the oven, the bulb in a second position being retracted a predetermined amount from the oven wall whereby the bulb experiences a temperature which is an analog of the oven wall temperature, and heat fins located within the oven cavity and fastened to the rear wall thereof and in close thermal relationship with the heating means as well as with the bulb when the bulb is in its first position so as to reduce the temperature lag between the bulb and the oven air temperature.

References Cited by the Examiner

UNITED STATES PATENTS

| | | | |
|---|---|---|---|
| 2,980,875 | 4/1961 | Sivacek | 338—25 |
| 3,121,158 | 2/1964 | Hurko | 219—397 |
| 3,176,118 | 3/1965 | Scott | 219—394 |

RICHARD M. WOOD, *Primary Examiner.*

C. L. ALBRITTON, *Assistant Examiner.*